Feb. 3, 1925.
W. D. BAKER
1,524,963
HEADLIGHT
Filed Sept. 11, 1923
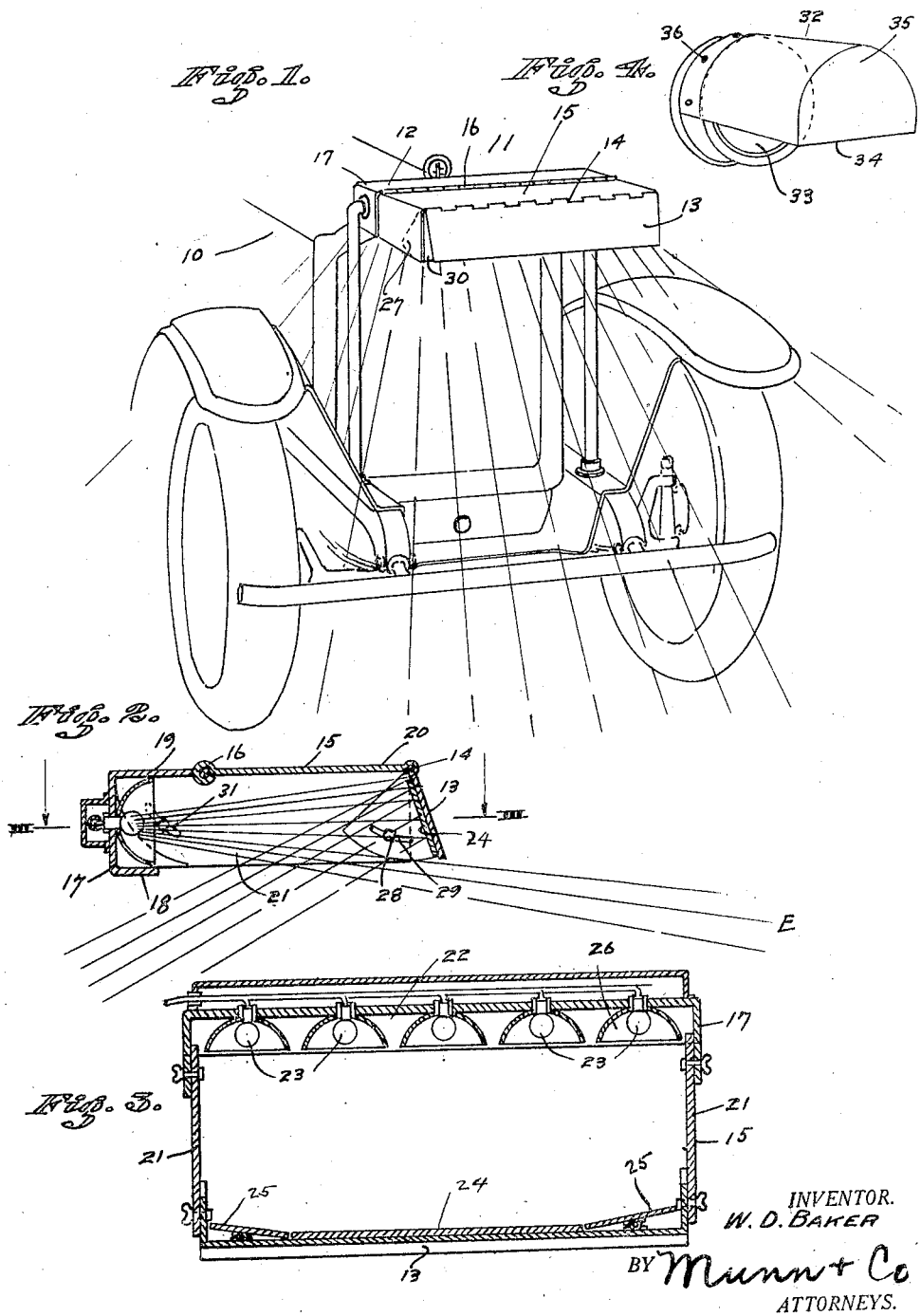
INVENTOR.
W. D. BAKER
BY Munn + Co
ATTORNEYS.

Patented Feb. 3, 1925.

1,524,963

UNITED STATES PATENT OFFICE.

WILLIAM D. BAKER, OF VERNALIS, CALIFORNIA.

HEADLIGHT.

Application filed September 11, 1923. Serial No. 662,148.

*To all whom it may concern:*

Be it known that I, WILLIAM D. BAKER, a citizen of the United States, and a resident of Vernalis, county of San Joaquin, State of California, have invented a new and useful Headlight, of which the following is a specification.

This invention relates to vehicle headlamps and has for its primary object the provision of a head lamp for projecting a beam of light in a rearward direction so as to illuminate the vehicle to give a visual outline thereof to pedestrians and drivers in front, and to this end, the invention is characterized by novel means which will satisfactorily function as aforesaid, and at the same time illuminate the roadway directly in front of the vehicle and to the respective sides thereof.

A still further object of the invention is to provide a novel form of head lamp of this character which, aside from functioning as previously stated herein, will eliminate the objectionable glare of the light ray which is so frequently the cause of accidents upon public highways by the drivers of automobiles and pedestrians being temporarily blinded by the glare of light.

Heretofore head lamps have generally consisted of a clear glass lens behind which is placed a light source and reflector, the parts functioning to project a very brilliant light in a forward direction or a beam of light almost on a horizontal plane to the roadway and for a considerable distance in advance of the vehicle on which the lamp is mounted. In carrying my invention into practice I provide means which, in effect, entirely conceals the light source to the eye of the observer in front of the vehicle, or to the driver of an approaching vehicle, and at the same time clearly illuminates the vehicle with which my improved lamp is equipped so that the vehicle is clearly discernible for a considerable distance in advance thereof, and in fact such distance as is found necessary for the gauging of traffic conditions upon a highway without inviting collision of vehicles travelling respectively in opposite directions.

A still further object of the invention is to provide a vehicle head lamp which will eliminate the objectionable forward glare of light in the eyes of the driver of an approaching vehicle, and in the eyes of pedestrians crossing the highway and at the same time cause such distribution of light upon the highway as to enable the driver of the vehicle to properly visualize road conditions to the front and at either side without fear of accident.

My invention, therefore, comprises certain new features of construction and arrangement and combination of elements hereinafter set forth and pointed out in the claims annexed hereto.

In the drawings:

Figure 1 is a perspective view of the forward portion of an automobile showing an application of my invention thereto;

Figure 2 is a horizontal section through the head lamp;

Figure 3 is a section taken on line 3—3 of Figure 2; and

Figure 4 is a perspective view of a slightly modified form of my invention.

(10) indicates the forward portion of an automobile or similar vehicle. My improved head lamp is indicated at (11) and is preferably mounted on a line approximately with the top of the radiator, and slightly above same and as illustrated is disposed on a vertical line in front of the radiator. The purpose of this arrangement will appear as the nature of the invention is better understood. The head lamp principally consists of two coacting sections (12) and (13), the latter being somewhat in the nature of a shutter or anti-glare plate of opaque or non-transparent material and same is hinged along its upper edge at (14) to the forward part (15) of the section (12). The said forward part (15) is hinged at (16) to the companion part (17) of said section (12).

The section (12) is somewhat in the form of a housing and the part (17) thereof is formed with a relatively short bottom wall (18) and a slightly longer forwardly projecting top wall (19). The part (15) comprises a top wall (20) and substantially parallel side walls (21—21). It will thus be observed that the said part (15) is open along its entire bottom and that the forward portion of said part (15) is, in effect, closed by the aforesaid shutter or anti-glare section (13).

The part (17) accommodates a light source (22), which, as shown in Figure 3 includes a series of equi-distantly spaced lamps (23), or this source may consist of simply one or any suitable number of lamps as may be decided to be most effective and appropriate when used in connection with the component instrumentalities of my invention, and as may be determined to give rise to the creation of the requisite amount of light to suit the requirements or taste of a particular user.

It will be observed upon reference to Figure 2 that the shutter or anti-glare section (13) is approximately on a horizontal line drawn through the longitudinal axes of the lamps (23). It will also be observed that said section (13) is provided in suitable spaced relation to its inner surface with a mirror or suitable form of reflector (24) and that coacting therewith at the ends thereof are tilting or angularly adjustable reflectors (25—25) as shown clearly in Figure 3 of the drawings. The mirror (24) is fixed with respect to the coacting side mirrors (25) and extends across the path of light projection of a plurality of the lamps (23). The side reflectors (25) are preferably disposed in line with the respective end lamps (23). As previously stated the part 15 of the section 12 of the head lamp is formed with an open bottom permitting the respective mirrors 24 and 25 to reflect certain beams of light rearwardly and to one side of the vehicle 10, other beams of light to the other side of the vehicle and the bulk of the beams rearwardly onto the roadway in accordance with the angularity of the shutter or anti-glare section 13. At this point it shall be observed that each of the lamps (23) is provided with a suitable well known form of reflector (26) which functions in view of the open bottom formation of the part (15) to cause a beam of light E to be projected forwardly and downwardly onto the roadway from beneath the lower edge of the said shutter or anti-glare section (13). It is now understood that due to the respective angularities of the mirrors (24) and (25—25) their relation to the lamps (23) and the function of the reflectors (26), light will be projected so as to illuminate the vehicle (10) and permit the outline of same to be clearly visualized for a great distance in front of the vehicle. The arrangement is also such that in addition to this functioning of the component parts of my invention the beam of light E is projected downward at an angle below the horizontal plane of the lamp so as to prevent this beam from being projected into the eyes of an advancing driver or pedestrians crossing a highway and it so illuminates the highway as to make the conditions thereof clearly discernible to the eye of the driver behind the lamp.

The shutter or anti-glare section (13) may be held in its respective positions of adjustment by means (27) in the form of bolts (28) operating in arcuate slots (29) formed in the wings (30) of the section (13) as clearly illustrated in Figures 1 and 2. Also as described herein the part (15) of the section (11) is hingedly mounted so that its angle may be changed to vary the light reflection upon the vehicle and upon the roadway. Adjustments of this part may be secured by means (31) identical in form with the means (27) just referred to. In this connection, however, I do not wish to be limited and except for the broad or general details of construction of the invention I wish to reserve the privilege of resorting to the use of such mechanical or obvious equivalents of the instrumentalities stated herein as may be found most desirable for the purpose.

In the modified form of my invention shown in Figure 4, I provide a substantially closure like structure (32) adapted to be secured much in the fashion of a visor to the front of an ordinary head lamp (33). The essential features of novelty of this form of my invention are in agreement with corresponding features of the first said form, but for the purpose of simplicity the device may be formed from a single strip of sheet material and same is provided with an open bottom (34) and an angularly disposed section (35), the latter corresponding with the section (12) in the first embodiment of my invention, and the inner surface thereof may be painted white or it can be coated with any suitable paint or substance that would enable it to serve as a reflector of light. If desired glass may be used as employed in the first embodiment. In this form the device may be detachably secured to the head lamp (33) by means of suitable fastenings (36).

While I have shown certain embodiments of my invention, I wish to have it understood that various changes or modifications may be made within the scope of the claims hereto attached without departing from the spirit of the invention.

I claim:

1. In a headlight for a motor vehicle, a source of light and a structure covering the same on top and on all sides presenting a hinged front reflecting wall adapted to divert part of the light rays rearwardly to illuminate the front end of the vehicle and lateral reflecting wings hingedly associated with the front wall adapted to divert the light rays toward the wheels of the vehicle.

2. In a headlight for a motor vehicle, a source of light and a structure covering the same on top and on all sides presenting a hinged front reflecting wall adapted to divert part of the light rays rearwardly to illuminate the front end of the vehicle and lateral reflecting wings associated with the front wall adapted to divert the light rays toward the wheels of the vehicle.

WILLIAM D. BAKER.